United States Patent
Strong et al.

(10) Patent No.: US 7,216,177 B1
(45) Date of Patent: May 8, 2007

(54) APPARATUS AND METHOD FOR SUPPLYING ELECTRONIC CONTENT TO NETWORK APPLIANCES

(75) Inventors: Jack B Strong, Mountain View, CA (US); John N Lehner, Sunnyvale, CA (US); Jonathan J Kleid, Mountain View, CA (US); Vivek Patel, Palo Alto, CA (US)

(73) Assignee: Palm, Inc., Sunnyvale, CA (US)

( * ) Notice: Subject to any disclaimer, the term of this patent is extended or adjusted under 35 U.S.C. 154(b) by 560 days.

(21) Appl. No.: 09/883,101

(22) Filed: Jun. 15, 2001

Related U.S. Application Data

(60) Provisional application No. 60/212,147, filed on Jun. 16, 2000.

(51) Int. Cl.
 *G06F 15/16* (2006.01)
(52) U.S. Cl. ............... 709/230; 709/203; 709/249; 370/401; 370/466; 379/900
(58) Field of Classification Search ............... 709/217, 709/219, 234, 236, 246, 203, 230, 249; 370/401, 370/466; 379/900
See application file for complete search history.

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,587,630 A | 5/1986 | Straton et al. | |
| 4,725,694 A | 2/1988 | Auer et al. | |
| 4,916,441 A | 4/1990 | Gombrich | |
| 4,972,457 A | 11/1990 | O'Sullivan | 379/59 |
| 5,067,164 A | 11/1991 | Denker et al. | |
| 5,101,439 A | 3/1992 | Kiang | |
| RE34,034 E | 8/1992 | O'Sullivan | 379/59 |
| 5,189,632 A | 2/1993 | Paajanen | 364/705.05 |
| 5,227,614 A | 7/1993 | Danielson et al. | |
| 5,305,195 A | 4/1994 | Murphy | 364/401 |
| 5,334,824 A | 8/1994 | Martinez | |
| 5,335,276 A | 8/1994 | Thompson et al. | |
| 5,379,057 A | 1/1995 | Clough et al. | |
| 5,392,447 A | 2/1995 | Schlack et al. | |
| 5,398,021 A | 3/1995 | Moore | 340/825.27 |

(Continued)

FOREIGN PATENT DOCUMENTS

EP 0149762 A1 7/1986

(Continued)

OTHER PUBLICATIONS

*American Programmer*, N.Y., American Programmer, Inc. (Dec. 1991), pp. 4-33.

(Continued)

*Primary Examiner*—David Wiley
*Assistant Examiner*—Phuoc H. Nguyen
(74) *Attorney, Agent, or Firm*—Fenwick & West LLP

(57) ABSTRACT

A system and method communicates data from a web content provider to a wireless computing device (e.g., a PDA, a cellular phone) via a proxy server. The proxy server transforms web content "on-the-fly" into a streamlined format, optimizes it for display, and delivers it to the device, where it is progressively rendered by a browser installed on the device.

14 Claims, 2 Drawing Sheets

U.S. PATENT DOCUMENTS

| | | | | |
|---|---|---|---|---|
| 5,436,960 | A | 7/1995 | Campana | 379/58 |
| 5,465,401 | A | 11/1995 | Thompson | |
| 5,513,254 | A | 4/1996 | Markowitz | 379/100 |
| 5,572,643 | A | 11/1996 | Judson | 395/793 |
| 5,673,322 | A | 9/1997 | Pepe et al. | 380/49 |
| 5,704,029 | A | 12/1997 | Wright, Jr. | 395/149 |
| 5,708,478 | A | 1/1998 | Tognazzini | 348/552 |
| 5,732,074 | A | 3/1998 | Spaur et al. | 370/313 |
| 5,781,894 | A | 7/1998 | Petrecca et al. | 705/14 |
| 5,809,317 | A | 9/1998 | Kogan et al. | 395/762 |
| 5,812,131 | A | 9/1998 | Bertram | |
| 5,818,446 | A | 10/1998 | Bertram et al. | 345/334 |
| 5,835,861 | A | 11/1998 | Whiteside | 455/466 |
| 5,838,314 | A | 11/1998 | Neel et al. | 345/327 |
| 5,848,397 | A | 12/1998 | Marsh et al. | 705/14 |
| 5,850,433 | A | 12/1998 | Rondeau | 379/201 |
| 5,852,775 | A | 12/1998 | Hidary | 455/404 |
| 5,854,624 | A | 12/1998 | Grant | 345/169 |
| 5,854,897 | A | 12/1998 | Radziewicz et al. | 395/200.54 |
| 5,870,683 | A | 2/1999 | Wells et al. | 455/566 |
| 5,877,757 | A | 3/1999 | Baldwin et al. | 345/336 |
| 5,889,852 | A | 3/1999 | Rosecrans et al. | 379/355 |
| 5,913,040 | A | 6/1999 | Rakavy et al. | 395/200.62 |
| 5,918,236 | A | 6/1999 | Wical | 707/500 |
| 5,923,736 | A | 7/1999 | Shachar | 379/93.17 |
| 5,948,061 | A | 9/1999 | Merriman et al. | 709/219 |
| 5,960,074 | A | 9/1999 | Clark | 379/310 |
| 5,977,972 | A | 11/1999 | Bates et al. | 345/341 |
| 6,058,304 | A | 5/2000 | Callaghan et al. | |
| 6,067,451 | A | 5/2000 | Campana | 455/412 |
| 6,119,167 | A * | 9/2000 | Boyle et al. | 709/234 |
| 6,188,789 | B1 | 2/2001 | Marianetti | 382/189 |
| RE37,141 | E | 4/2001 | O'Sullivan | 455/557 |
| 6,219,694 | B1 | 4/2001 | Lazaridis | 709/206 |
| 6,247,048 | B1 * | 6/2001 | Greer et al. | 709/219 |
| 6,272,190 | B1 | 8/2001 | Campana | 375/347 |
| 6,292,833 | B1 * | 9/2001 | Liao et al. | 709/229 |
| 6,295,372 | B1 | 9/2001 | Hawkins et al. | |
| 6,334,056 | B1 * | 12/2001 | Holmes et al. | 455/445 |
| 6,336,137 | B1 * | 1/2002 | Lee et al. | 709/219 |
| 6,356,529 | B1 | 3/2002 | Zarom | 370/466 |
| 6,397,259 | B1 * | 5/2002 | Lincke et al. | 709/236 |
| 6,414,962 | B1 * | 7/2002 | Hall et al. | 370/401 |
| 6,430,624 | B1 * | 8/2002 | Jamtgaard et al. | 709/246 |
| 6,473,609 | B1 * | 10/2002 | Schwartz et al. | 455/406 |
| 6,593,944 | B1 | 7/2003 | Nicolas et al. | |
| 6,611,358 | B1 | 8/2003 | Narayanaswamy | |
| 6,636,873 | B1 * | 10/2003 | Carini et al. | 707/201 |

FOREIGN PATENT DOCUMENTS

| | | |
|---|---|---|
| EP | 0797368 A2 | 3/1997 |
| JP | 03204259 | 5/1991 |
| WO | WO 97/26729 | 7/1997 |
| WO | WO 98/47090 | 10/1998 |

OTHER PUBLICATIONS

*At Last, Technology Harnesse [sic] One of the Most Powerf [sic] Forces known to Man.*, Foster City, GO Corporation, 1991, 14 pages.
AT&T New Release, *NCR Cuts Price of 3170 Notebook Computer 11 to 19 Percent* [online]. (Mar. 8, 1993), Retrieved from the Internet: <URL:http://www.att.com/press/0393/930308.nca.html> 2 pages.
Carr, R.M., *The Point of the Pen, Byte* (Feb. 1991, Reprinted), 10 pages.
Cullen, A., *Connecting With Your EO Cellular Module*, Mountain View, EO, Inc., 1992, 1993, pp. ii-33.
Cullen, A., *Getting Started With Your EO Personal Communicator*, Mountain View, EO, Inc., 1992, 1993, pp. ii-74.
Cullen, A., *Lookup Guide to the EO Personal Communicator*, Mountain View, EO, Inc., 1992, 1993, pp. ii-320.
*Go Corporation Information Statement*, (Nov. 8, 1993), 114 pages.
*IBM Selects Racotek Data/Voice Communications Services to Interface With Touchmobile Product*, PR Newswire (Jan. 25, 1993), 2 pages.
*IBM TouchMobile Information and Planning Guide*, International Business Machines Incorporated (Mar. 1993), 20 pages.
*IBM TouchMobile Solution for Data Capture and Communication, Keeping Your Business Moving in the 90s*, International Business Machines Incorporated (Jan. 1993), 13 pages.
*IBM'S Touchmobile Helps Field Workers Collect Data at the Touch of a Finger*, PR Newswire (Jan. 26, 1993), 2 pages.
MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.
MacNeill, D., *Wireless Newton Technology Goes to Work*, On The Go Magazine [online] , (Sep. 8, 1993), Retrieved from the Internet: <URL:http://www.pencomputing.com/Newton/NewtonNotes1.html>2 pages.
Maki, K., *The AT&T EO Travel Guide*, N.Y., John Wiley & Sons, Inc., 1993, pp. iii-555.
Schlender, B. R. *Hot New PCs That Read Your Writing, Fortune* (Feb. 11, 1991, Reprinted), 6 pages.
Stock, R., *The World of Messaging An Introduction to Personal Communications*, Mountain View, EO, Inc., 1992, 1993, pp. ii-69.
"IBM WebSphere Transcoding Publisher, Version 4.0 for Multiplatform" [online], 2001, IBM Corporation [retrieved Aug. 12, 2003]. Retrieved from the Internet.
"Improving the Wireless Experience"[online], 2000, IBM Corporation [retrieved Aug. 12, 2003]. Retrieved from Internet: <URL: http://web.archive.org/web/20001206213400/www.bluelark.com/products/bluesky.php>.
AdvantGo Inc. Home Page [online], 1998, [retrieved Aug. 12, 2003]. Retrieved from Internet: <URL: http://web.archive.org/web/19981212023007/http://www.avantgo.com>.
"AdvantGo.com Available to Macintosh Users" [online], 1999, AvantGo [retrieved Aug. 12, 2003]. Retrieved from Internet: <URL: http://web.archive.org/web/20000407204511/corp.avantgo.com/news/releases/release/html>.
"Understanding the Needs of Physicians and Working to Meet Them" [online], 2000, ePocrates, Inc. [retrieved Aug. 12, 2003]. Retrieved from Internet: <URL: http://web.archive.org/web/20000302071432/http://epocrates.com>.
"ePocrates qRx Version 3.0 is the Leading Clinical Drug Reference Guide Designed for the Palm OS™ Platform" [online], 2000, ePocrates, Inc. [retrieved Aug. 12, 2003]. Retrieved from Internet: <URL: http://web.archive.org/web/20000816052411/www.epocrates.com/products/qRx>.
Questions and Answers for "ePocrates qRx Version 3.0 is the Leading Clinical Drug Reference Guide Designed for the Palm OS™ Platform" [online], 2000, ePocrates, Inc. [retrieved Aug. 12, 2003]. Retrieved from Internet: <URL: http://web.archive.org/web/20000819052441/www.epocrates.com/products/qRx/faq.cfm>.
Online Anywhere Home Page [online], Date Unknown, [retrieved Aug. 12, 2003]. Retrieved from Internet: <URL: http://web.archive.org/web/19990125101821/http://www/onlineanywhere.com>.
"Author Once, View Anywhere" [online], Date Unknown, Online Anywhere, [retrieved Aug. 12, 2003]. Retrieved from Internet: <URL: http://web.archive.org/web/19990503085641/www.onlineanywhere.com/products.htm>.
Puma Technology Home Page [online], Date Unknown, [retrieved Aug. 12, 2003]. Retrieved from Internet: <URL: http://web.archive.org/web/19970227205330/http://www.pumatech.com>.
"Mobile Data Exchange" [online], Date Unknown, PumaTech, [retrieved Aug. 12, 2003]. Retrieved from Internet: <URL: http://web.archive.org/web/19970227205348/www.pumatech.com/MobileData.html>.
"Products" [online], Date Unknown, PumaTech, [retrieved Aug. 12, 2003]. Retrieved from Internet: <URL: http://web.archive.org/web/19970227205356/www.pumatech.com/Products.html>.

"Synchronize Your Pilot Directly With Your PC Applications" [online], Date Unknown, PumaTech, [retrieved Aug. 12, 2003]. Retrieved from Internet: <URL: http://web.archive.org/web/19970227205457/www.pumatech.com/IntelliSync.html>.

"Easily Exchange and Synchronize Information Between Your HP 200LX Palmtop PC and Your PC" [online], Date Unknown, PumaTech, [retrieved Aug. 12, 2003]. Retrieved from Internet: <URL: http://web.archive.org/web/19970227205506/www.pumatech.com/IntelliSyncHP.html>.

"Synchronize Your Windows CE Handheld Device Directly With Your PC Applications" [online], Date Unknown, PumaTech, [retrieved Aug. 12, 2003]. Retrieved from Internet: <URL: http://web.archive.org/web/19970227205526/www.pumatech.com/IntelliSyncCE.html>.

BlackBerry Handheld Users Guide, Sep. 7, 1999.

BlackBerry Developer's Guide SDK User's Guide Version 2.0 (Data TAC), Jun. 12, 2000.

BlackBerry Enterprise Server Software Installation and Getting Started Guide, Sep. 29, 1999.

Choi, H., *First Look: Samsung I300 Cellphone/PDA*, retrieved from internet www.techtv.com, Mar. 28, 2001.

Handspring Product Information: *VisorPhone The Springboard Module that Transforms your Visor into an Extraordinary Phone*, (2000).

Handspring, *Sprint and Airprime Delivery First Wireless CDMA Phone and Data Module for the Handspring Visor*, retrieved from internet www.handspring/pr59.jhtml Aug. 2, 2001.

IBM Technical Disclosure Bulletin: *SimpleUser Interface to a Cellular Telephone*, retrieved from internet, Oct. 2001.

Kyocera's Smartphone Series, retrieved from internet www.kyocera-wireless.com, Apr. 2001.

Tam, P., "Palm, Motorola to Make PDA Cell Phones", retrieved from internet http://www.zdnet.com/zdnn/stories/news/0,4586,2631800,00.html, Sep. 25, 2000.

Kamada, T., Compact HTML for Small Information Appliances, W3 Consortium Note Feb. 9, 1998, pp. 1-12, USA.

UP SDKDocumentation: HDML 2.0 Language Reference Version 2.0, Unwired Planet, Jul. 1997, pp. 1-56, Redwood Shores, CA.

Hara, Y., W3C Putting Compact HTML, HDML to Test for Net Access—Mobile Markup Languages Face Off, Electronic Engineering Times, No. 1001, Apr. 6, 1998, pp. 1-2, Tokyo, Japan.

Hyland, T., Handheld Device Markup Language FAQ, Unwired Planet, W3 Consortium Note, Apr. 1, 1997, pp. 1-3, Redwood Shores, CA.

Intelligent User Interface Prompt Level, IBM Technical Disclosure Bulleting, vol. 35, No. 1A, Jun 1, 1992, pp. 25-26, Armonk, New York.

Stajano, F., et al.; The Thinnest of Clients: Controlling It All Via Cellphone, Mobile Computing and Communications Review, vol. 2, No. 4, pp. 1-8 (Oct. 1998).

* cited by examiner

APPARATUS AND METHOD FOR SUPPLYING ELECTRONIC CONTENT TO NETWORK APPLIANCES

CROSS REFERENCE TO RELATED APPLICATIONS

This application is based on and claims priority under 35 USC § 119(e) of U.S. Provisional Patent Application No. 60/212,147, filed on Jun. 16, 2000 and entitled "Apparatus and Method for Supplying Electronic Content to Network Appliances", which is incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Until recently, the vast majority of internet users accessed the World Wide Web via personal computers and workstations. Web designers could safely assume that the devices accessing their sites would have similar display capabilities, processor speed, and connection bandwidth. With careful design, it was possible to produce a single version of a web site that displayed satisfactorily in nearly all browsers. Unfortunately, this is no longer possible. The number and variety of so-called "network appliances" has exploded. Millions of internet users now log on via set top boxes, personal digital assistants (PDAs), and cellular telephones. Analysts have predicted that more people will soon access the web via network appliances than via personal computers. Now, web designers must take into account that browsers accessing their sites may display just a few words of text at a time, or they may display hundreds. Other browsers have no display at all and instead read the content to the user through a telephone. Processor speeds and bandwidth may vary by an order of magnitude. To make matters worse, different devices support different sets of file formats, often with no intersection at all.

Web content providers that need to support users on all these devices typically have to provide multiple versions of their sites. Amazon.com currently has three versions of its site: the conventional HTML version; an HDML version for display on first generation cell phone browsers; and a "web clipping" version for certain handheld computing devices. A fourth version will be for WML capable cell phones. Only content providers with the deepest pockets can afford to author so many different versions of their sites. Even for giants like Amazon.com, this approach is clearly not scalable as the variety of network appliances continues to increase.

As with many problems in computer science, this dilemma can be at least partially solved by adding a level of indirection. In internet terms, the level of indirection between a browser and a web server is called a proxy server. The model is simple. When a browser needs to retrieve a document from the web, it sends a request to the proxy server using the browser's native protocol. The proxy then retrieves the document from the server. If the document happens to be in a format that the browser is capable of displaying, the proxy will simply forward it along. This is where the process ends for most, if not all, traditional proxy servers.

SUMMARY

Embodiments of the present invention relate to a system and method for communicating data from a web content provider to a wireless computing device (e.g., a PDA, a cellular phone) via a proxy server. The proxy server transforms web content "on-the-fly" into a streamlined format, optimizes it for display, and delivers it to the device, where it is progressively rendered by a browser installed on the device.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Figure 1:
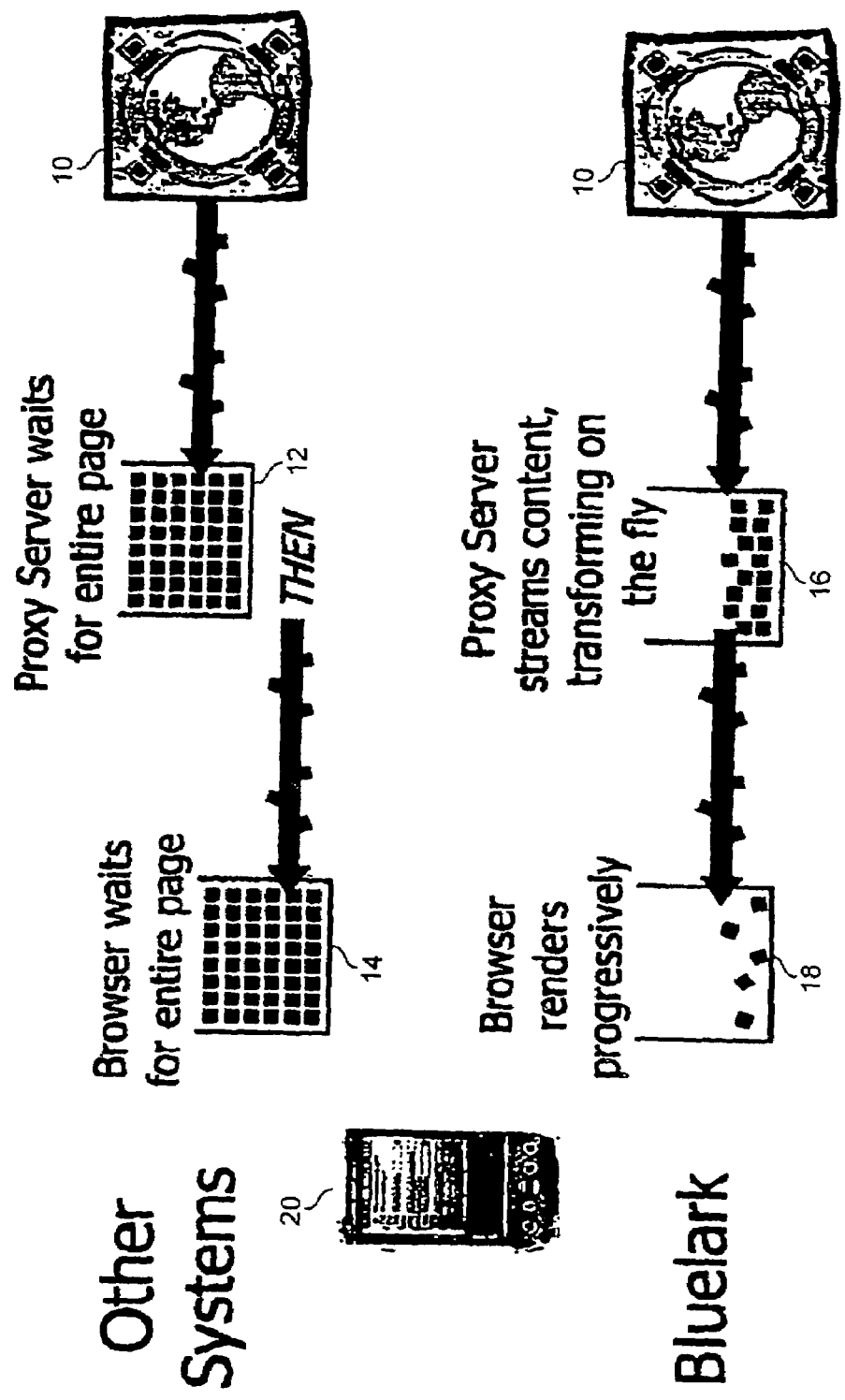
FIG. 1 is a simplified diagrammatic representation of an embodiment of the invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to a system and method for communicating data from a web content provider to a wireless computing device (e.g., a PDA, a cellular phone) via a proxy server. The proxy server transforms web content "on-the-fly" into a streamlined format, optimizes it for display, and delivers it to the device, where it is progressively rendered by a browser installed on the device.

When a document (e.g., a web page) received by the proxy server is not in a format capable of being displayed by a requesting wireless device, the proxy server will attempt to transform the document into an acceptable format. For example, if the web content provider sends a document marked up in HTML, and the browser of the requesting wireless device only supports WML, the proxy server can run the document through an HTML-to-WML translation module. Other formats possibly supported by wireless devices to which the proxy server may transform format include, for example, HDML, PQA (also known as the "web clipping" format), XHTML, Basic, and AvantGo's non-standard HTML subset.

Further, in one or more embodiments, this model can be extended beyond simply file format translations to encompass display optimizations as well. For example, if the web content provider sends a 256-color GIF image, and the requesting wireless device supports only 4 shades of gray, the proxy server may then reduce the bit depth of the image, thereby (i) saving the wireless device the processing overhead of doing the conversion itself and (ii) reducing the file size to optimize transmission speed over a low bandwidth connection.

Moreover, those skilled in the art will appreciate that the conversion process is transparent to both the web content developer and the user of browser of the requesting wireless device. In other words, a proxy server in accordance with one or more embodiments frees end users (both content producers and content consumers) from concerning themselves with the proxy server. Typical prior art proxy servers require either the content provider or browser developer to maintain the proxy server. This included not only maintaining a server farm, but also keeping the transformation software up-to-date on all of the latest file formats and device capabilities. In one or more embodiments, by disassociating the transformation engine from both the server and the client, a third party application service provider may maintain the proxy. Further, the transformation software may be upgraded to support new devices and formats in a manner that is transparent to both the content provider and the end user. This degree of transparency is believed to be important to the widespread adoption of proxy-based transformation technology. Moreover, in one or more embodiments, the transformation software may be updated automatically via, for example, the Internet.

The transformation of content by a proxy server in accordance with one or more embodiments may be dynamic and/or based on user-agent profiles stored locally on the proxy server, provided by the user-agent, and/or retrieved from another server based in information provided by the user-agent. The profiles may specify supported content types, display characteristics of the device, and/or transformation preferences, and allow the proxy server to optimize a display for user-agents whose capabilities are not known at the time the proxy server is deployed.

Now referring to FIG. 1, prior art proxy servers 12 (shown as "other systems") wait for an entire web page to be received from a web content provider 10. Once the data for the entire web page has been received, the proxy server 12 transforms the data to a format for display by a web browser 14 of a requesting wireless device 20. The web browser 14 then waits for the entire web page data to be received prior to displaying the web page.

Still referring to FIG. 1, in one or more embodiments, a proxy server 16 receives web page data in a streamlined manner and transforms received web page data "on-the-fly". In other words, the proxy server 16 transforms and sends for display by a web browser 18 web page data as the proxy server 16 receives web page data from the web content provider 10. Thus, the proxy server 16 may receive portions of data for a web page after other portions of the web page data have already been transformed and sent by the proxy server 16. Moreover, the web browser 18 in accordance with one or more embodiments is arranged to progressively render received web page data. In other words, the web browser 18 may display the web page data as it receives it; it does not have to wait for all of the web page data to be received.

Figure 2:
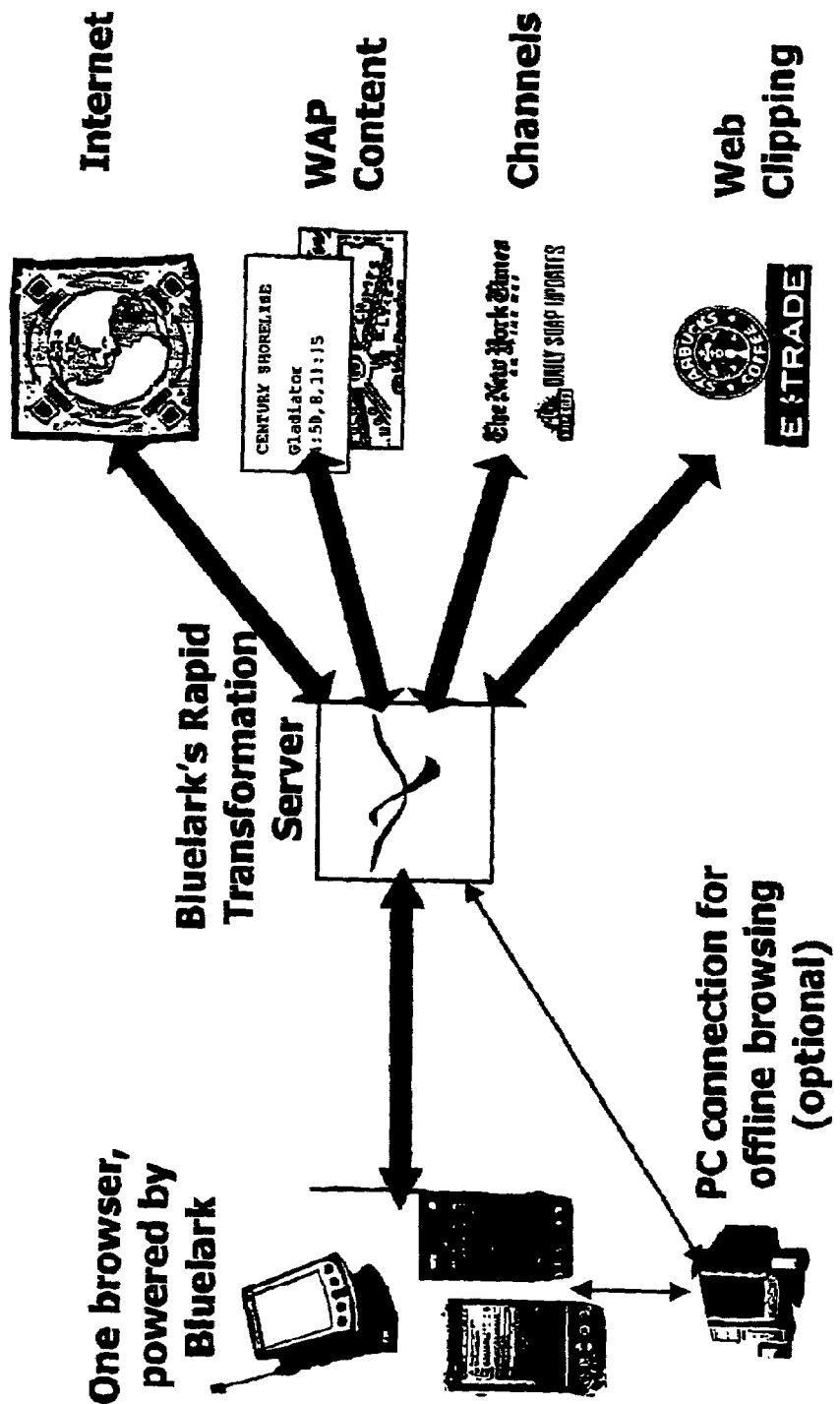
FIG. 2 is a simplified illustration of a progressive rendering technique employed in an embodiment of the invention.

Thus, the proxy server 16 transforms web content into a streamlined format and optimizes it for display on a screen of a requesting wireless device 20. The requesting wireless device 20 may have a web browser 18 that is arranged to progressively render received web page data. In such a manner, users may view content created in any format through a single web browser (instead of having to use separate applications) (see FIG. 2), and do so in an environment in which web pages load relatively quickly due to the content streamlining mechanism described with reference to FIG. 1.

Accordingly, a system in accordance with one or more embodiments involves at least one of on-the-fly transformation, on-the-fly content transformation for optimal display on a device screen, "rapid streaming" technology, and a web browser that progressively renders received web page data.

A web browser in accordance with one or more embodiments will now be described. The web browser application may be structured as an object-oriented program. One set of classes may be primarily focused on aspects of a particular computing environment, such as responding to launch codes and user events. A second set of classes may be responsible for browser specific tasks, such as creating a parse tree from a WML document and displaying the data. A third set may be responsible for interfacing between OS independent browsing code and operating system code. A fourth set may include generic, reusable components such as vectors and iterators. Sub-goals may be to create a reusable framework for application development, as well as a platform independent browser kernel. Those skilled in the art will note that these sub-goals, among others, may naturally leas to clean abstractions.

Application
   Top-most level of application
   Determines whether the current operating environment is suitable for this application (i.e. make sure the OS version number is not too old).
   Handles launch codes (e.g. normal launch, soft reset, beam received).
   Receives all user input; must dispatch commands to the appropriate handlers.
   An application is defined by a series of forms, so this class must manage a set of forms that are each active at different times.

Form
   Represents abstract form (e.g., a window). Meant to be sub-classed by forms with specific functions.
   Supplies UI functions common to all (or at least most) forms.
   Contains zero or more views, arranged in some form specific way.

View
   Represents abstract region for displaying some sort of content or Ul.
   Not nestable (i.e. a view cannot contain another view)
   Gives forms more flexibility since views are location independent (i.e. all drawing within a view is relative to the view's coordinates)

Preferences
   Manages the storage of persistent preferences used by the application.

EventHandler
   Abstract interface for any component that can handle user events (i.e. Form, View)

Browser Components

Expat
   Collection of open source C files which parse XML files. Expat as a shared library to perform parsing, and will subsequently build a parse tree based on its output.

XMLParser
   Wrapper around expat and the parse tree (expat could be replaced by a different parser, and only this class would be affected).
   Manages the construction of the tree, using expat to build a tree composed of XMLElements and XMLAttributes.

XMLElement
   Single XML tag, with attributes and data

XMLAttribute
   Represents a single XML attribute

WMLGlyph
   Graphical representation of XMLElement.
   Based on recursive composition technique in *Design Patterns*, Chapter 1 (by the Gang of Four).
   A glyph can be a container for other glyphs, or can be a leaf.
   Glyphs draw themselves, and handle UI tasks within its boundaries.
   Examples of glyphs are images, blocks of text, and lines of text.

HTTPProtocol
   Implements HTTP Protocol for any underlying session mechanism (i.e. TCP)
   Possibly composed of public domain source code.

PalmOS/WML Browser Glue Components

WMLForm
   Subclass of Form, defines browser specific form features, such as back and forward arrows.
   Contains a WMLView WMLView
   Displays WML content. Can be embedded in any application that implements the Form and View classes described above.
   Gives WMLGlyph a display area for layout
   Responsible for scrolling WML content WMLSession
   Responsible for retrieving data, and supplying pages on demand to the WML browser.
   The underlying mechanisms will be pluggable, meaning regardless of whether a modem is used, or a Bluetooth module communicating to a cell phone, the rest of the browser will work in the same way.

TCPSession
   Subclass of WMLSession which uses built-in TCP stack
   Provides socket level instructions to enable HTTP Generic Classes Vector
   Easy to use data structure for managing groups of data Iterator
   Iterator for vector, or any other class which represents a collection of objects Types
   Defines commonly used types such as Point and Rectangle Component Interface Design Application
   main: entry point for application. Calls appropriate function depending on the launch code passed in. Performs suitability checks on environment.
   eventLoop: dispatches commands to appropriate eventHandlers, which have registered themselves. Keeps track of current handler.
   registerHandler: called by forms that can handle events, to tell the application that they should be used with forms of certain ID's. This is necessary because in the PalmOS, forms are labeled with ID numbers. By registering themselves, form objects become associated with the notion of a form.
   launchNormal: virtual function called by main when program is launched normally. Can be subclassed by applications to customize behavior.

Form
   formLoad, formOpen, formClose: Called by main event loop when this object is the current handler. formLoad should load resources needed to display the form, without writing anything to the screen. formOpen should draw the form itself. formClose should erase the form and release any resources.
   draw: Called by eventLoop (and possibly other functions) when the form's contents should be drawn/redrawn.
   addView. Adds new view to the form.
   handleEvent: Processes form specific events View
   handleEvent: Processes view specific events
   getBounds Returns the area used by the view Preferences
   read: reads prefs from storage into temporary data structure
   write: writes prefs from temporary data structure into storage
   Subclasses should provide assessors/modifiers for specific preferences.

EventHandler
   doesHandleType: Returns true if this object handles the specified event type (i.e. menu action)
   doesHandleObject: Returns true if this object handles the specified object (i.e. form with ID #4300)
   handleEvent: Actually handle the event. (Must be overridden by subclass)

Expat
   XML_SetElementHandler. Used to set the callback for new elements. Callback is called for each XML tag seen.
   XML_SetCharacterDataHandler: Used to set callback for data handler.

XMLParser
   parse: parses specified document, returns root element of document (of type XMLElement)

XMLElement
   addAttribute: adds attribute to element
   getAttribute: returns vector of attributes
   getTag: returns tag name XMLAttribute
   assessor/modifier for name, value pair WMLGlyph
- intersects: returns true if this glyph intersects specified point
- insert: inserts a sub-glyph into this glyph
- activate: called when the UI element containing the glyph is activated
- deactivate: called when the UI element containing the glyph is deactivated
- draw: recursively draws glyph, and all its sub-glyphs
- getExtent: returns bounds of glyph
- parent: returns parent glyph
- children: returns vector of children glyphs, if any HTTPProtocol
- sendRequest: sends request to server, returns requested data. Uses underlying session protocol as provided on device.

WMLForm
- overrides functions of Form, adding appropriate behavior WMLView
- overrides functions of View, adding appropriate behavior WMLSession
- set View: way for view to register itself with a session.
- goTo: called by view to get data of passed in URL TCPSession
- goTo: overridden from WMLSession
- provides underlying layer for HTTPProtocol to interact with, such as open socket, and read/write data.

Vector
- add: adds element to end of vector
- insert: inserts element into some position in vector
- remove: removes specified element
- removeAll: Empties vector
- getElementAt: returns specified element
- getNumElements: returns count of all elements.

Iterator
- hasNext: returns true if there are more elements
- getNext: returns next element Data Structure Design Important data structures are the representations of the WML document. After parsing, a simple parse tree is created. The parse tree's structure may be based on the notion that a child node is nested within their parent in the corresponding XML. For example, if a run of text looks like:

<p> <i> text </i> </p> then the element representing 'i' will be a child of the element representing 'p'. Further, the text element will be a child of i. XML attributes are represented as a vector of string pairs, where each pair corresponds to a name and value.

This parse tree is independent from the glyph tree, although the two trees are similar in structure. The glyph tree has at least one glyph per parse tree element, and possibly more. For example, a block of text that spans multiple lines is represented as a single element in the parse tree. In the glyph tree, however, it will become multiple glyphs—one for each line, and one for the text block itself. This is based on the Composite pattern, described in *Design Patterns*.

Vectors are used extensively as a convenient abstraction on top of arrays. STL may be used for data structures such as this. Data structures may be optimized in view of specific constraints faced.

Algorithm Design

The crux of the browser is the layout algorithm. It should be able to flow a wide variety of objects, and store their position in order to respond to user input (i.e. clicking on a link). It should be flexible enough to work concurrently with data download, so it must operate incrementally. It should be efficient, as computing resources may be limited. To facilitate these needs, the glyph tree to represent on screen information may be used, as described in the previous section. The glyph tree is flexible, in that a block of text can be reformatted into its constituent lines at any point and redrawn, if for example an image is newly downloaded and changes the flow of the document.

The glyph draw function may be implemented in a relatively coordinate independent way. This means that a glyph may be passed a display area in which to draw, which it can treat as its own canvas. Each glyph may also calculate the sub-areas available to its sub-glyphs. The rendering algorithm is then composed of all glyph types following this general contract. As long as glyphs draw only in the space allotted, and gives their sub-glyphs adequate screen real estate, then the contract is fulfilled. Because of the recursive nature of the algorithm, considerable information can be cached. For example, the extent of a glyph can be stored, so the getExtent function will not need to examine all sub-glyphs to recompute the extent.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A method of providing web content to a wireless computing device, comprising:
   receiving at a proxy server a first portion of data for a web page;
   determining whether a web browsing program of the wireless computing device is capable of displaying the received first portion of the web page data; and
   if the web browsing program is not capable of displaying the received first portion of the web page data,
      transforming the received first portion of the web page data for display by the web browsing program of the wireless computing device,
      sending the transformed first portion of the web page data to the wireless computing device,
      receiving at the proxy server a second portion of the web page data after the transforming of the received first portion of the web page data has begun,
      transforming the received second portion of the web page data for display by the web browsing program, and
      sending the transformed second portion of the web page data to the wireless computing device.

2. The method of claim 1, the transforming comprising: compressing the received first portion of the web page data.

3. The method of claim 1, the transforming comprising: converting the received first portion of the web page data from HTML to WML.

4. The method of claim 1, the transforming comprising: converting the received first portion of the web page data from HTML to HDML.

5. The method of claim 1, the transforming comprising:
converting the received first portion of the web page data from HTML to PQA.

6. The method of claim 1, the transforming comprising:
converting the received first portion of the web page data from HTML to XHTML.

7. The method of claim 1, the transforming comprising:
reformatting the received first portion of the web page data.

8. The method of claim 1, further comprising:
determining a type of the received first portion the web page data,
wherein the transforming is dependent on the type.

9. The method of claim 1, further comprising:
determining a type of the web browsing program,
wherein the transforming is dependent on the type.

10. The method of claim 1, further comprising at least one of:
determining a size of a display screen of the wireless computing device; and
determining at least one preference set by a user of the wireless computing device,
wherein the transforming is dependent on at least one of the size and the at least one preference.

11. An apparatus physically separate from a wireless computing device, comprising:
a module arranged to receive a first portion of data for a web page;
a module arranged to determine whether a web browsing program of the wireless computing device is capable of displaying the received first portion of the web page data;
a module arranged to transform the received first portion of the web page data for display by the web browsing program in response to a determination that the web browsing program is not capable of displaying the received first portion of the web page data;
a module arranged to send the transformed first portion of the web page data to the wireless computing device;
a module arranged to receive a second portion of the web page data after transformation of the received first portion of the web page data has begun;
a module arranged to transform the received second portion of the web page data for display by the web browsing program; and
a module arranged to send the transformed second portion of the web page data to the wireless computing device.

12. The apparatus of claim 11, wherein the first portion of the web page data is received from a web content provider operatively connected to the apparatus.

13. A system, comprising:
a web content provider arranged to host data for a web page; and
a proxy server operatively connected to the web content provider, wherein the proxy server is capable of communicating data to a wireless computing device,
wherein the proxy server is arranged to receive a first portion of the web page data from the web content provider, determine whether a web browsing program of the wireless computing device is capable of displaying the first portion of the web page data, transform the received first portion for display by the web browsing program in response to determining that the web browsing program is not capable of displaying the received first portion of the web page data, send the transformed first portion to the wireless computing device, receive from the web content provider a second portion of the web page data after transformation of the first portion of the web page data has begun, transform the received second portion for display by the web browsing program, and send the transformed second portion to the wireless computing device.

14. The system of claim 13, wherein the wireless computing device has a web browser arranged to progressively render web page data received from the proxy server.

* * * * *